Figure 1:
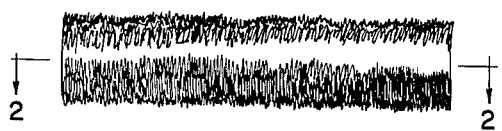

May 10, 1966     A. F. TURBAK     3,250,629
METHOD OF HUMIDIFYING SHIRRED ARTIFICIAL SAUSAGE CASINGS
Filed Feb. 4, 1964     3 Sheets-Sheet 1

ALBIN F. TURBAK.
INVENTOR.

BY Neal J Mosely
his Attorney

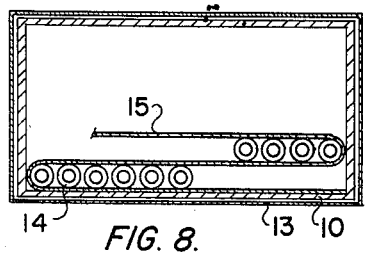
FIG. 8.
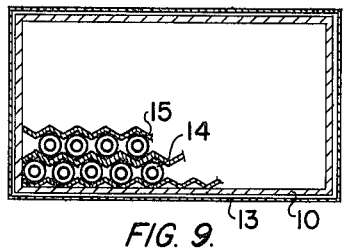
FIG. 9.
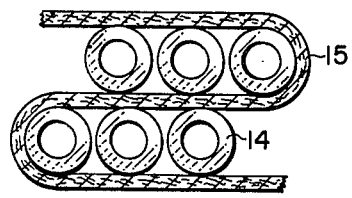
FIG. 8-A.
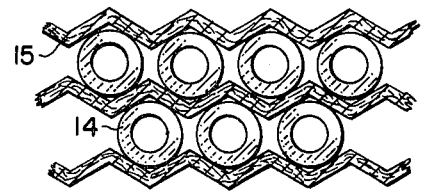
FIG. 9-A.
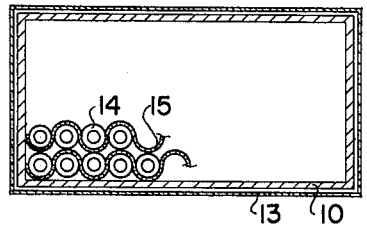
FIG. 10.
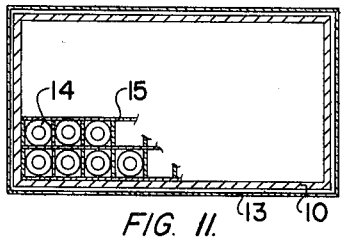
FIG. 11.
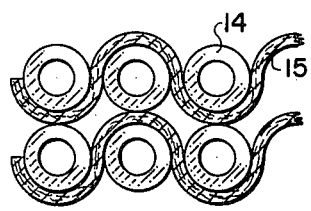
FIG. 10-A.
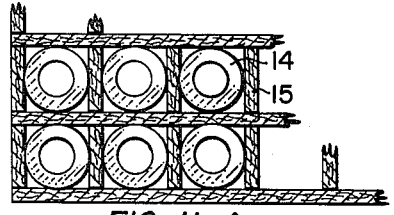
FIG. 11-A.
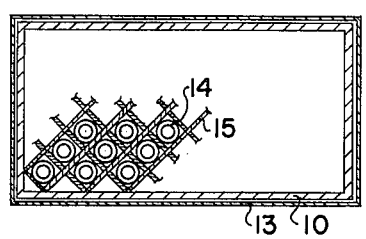
FIG. 12.
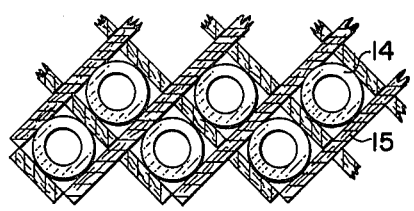
FIG. 12-A.
INVENTOR.
ALBIN F. TURBAK.

United States Patent Office 3,250,629
Patented May 10, 1966

3,250,629
METHOD OF HUMIDIFYING SHIRRED
ARTIFICIAL SAUSAGE CASINGS
Albin F. Turbak, Danville, Ill., assignor to Tee-Pak, Inc.,
Chicago, Ill., a corporation of Illinois
Filed Feb. 4, 1964, Ser. No. 342,368
8 Claims. (Cl. 99—176)

This invention relates to new and useful improvements in the packaging and humidification of shirred artificial sausage casings.

Artificial sausage casings, particularly casings formed of regenerated cellulose, are prepared as hollow, thin-walled tubes of very great length. For convenience in handling, these casings are shirred from lengths ranging from 40 to 160 ft. or more down to a shirred and compressed length of the order of a few inches. In the early days of the artificial sausage casing industry, casings were shirred by hand on a shirring mandrel and stored and packaged on a storage or packaging stick. At an early date, hand shirring was replaced by mechanical shirring. An early type shirring machine and the resulting shirred product are shown in Dietrich U.S. Patent 2,010,626. Improved forms of shirring machines and the products therefrom are shown in Korsgaard U.S. Patent 2,583,654, and Blizzard et al. U.S. Patents 2,722,714, 2,722,715, and 2,723,201.

In the preparation and use of artifical sausage casings, particularly casings formed of regenerated cellulose, the moisture content of the casings is of extreme importance. When the casings are first formed, it is necessary that they be dried to a relatively low water content, e.g., 8 to 10%. A lower water content in the casing generally results in damage to the casing during the shirring operation. Likewise, a higher water content results in damage to the casing during shirring, usually resulting from the casing sticking to the shirring mandrel.

After casing is shirred, it is packaged and shipped to meat packing houses where individual shirred strands are placed on a stuffing horn and a meat emulsion extruded to fill the casing to its fully extended length. The stuffing of the casing usually takes place within a few seconds with the result that the casing is extended from a shirred length of about 8 to 27 in. to an extended length of 40 to 160 ft. or more in a matter of 3 to 12 sec. This rapid extension of the casing during stuffing requires that the casing be especially strong and ressistant to tearing. If even minor holes develop in the casing, the casing may split or break during stuffing and waste a large quantity of meat. In the shirring of artificial sausage casings, the pleats which are formed are sometimes interlocked and are almost always nested in a concave manner to provide a tightly compressed strand of casing for shipment and handling. The tightly compressed and sometimes interlocked pleats require a higher moisture content to permit extension of the casing during the stuffing operation without tearing or breaking the casing. In general, an average moisture content of 14 to 20% is required, preferably about 16 to 18%. If the shirred casing has a moisture content less than about 14%, there is a tendency toward excessive breakage during stuffing. Likewise, if the casing has a moisture content in excess of about 20%, the casing is to plastic and may tend to overstuff. It is, therefore, essential that shirred casing be humidified to a relatively narrow, critical moisture range to permit stuffing without excessive breakage. In the past, shirred artificial sausage casings have been packaged in cartons or containers which are apertured at opposite ends to permit circulation of moist air through the shirred casing strand to produce the desired moisture content in the casing. When shirring machines of the type shown in the Dietrich U.S. Patent 2,010,626 were in use, the shirred casings which were produced were accordion pleated but did not have nested concave pleats which were tightly compacted to provide shirred strands which were self-supporting. As a result, the shirred casing strands had to be packaged in small individual packages which were easily removed from the package at the packing house after insertion over a stuffing horn. These individual cartons were apertured on both ends and the packaged casings were humidified by passing moist air through and over the casing strands. At a later date, a package was developed for shirred casings, as shown in Hewitt U.S. Patent 2,181,329, which had a plurality of apertures at opposite ends and which would contain a large number of shirred casings. The Hewitt package was designed to permit the packaging of a number of shirred casing strands while permitting circulation of moist air through and around the strands to bring the moisture content to the level required for satisfactory stuffing. An improvement on the casing carton of Hewitt is described and claimed in Firth U.S. Patent 2,794,544. The Hewitt and Firth packages, however, are both subject to substantial objections in commercial use. These packages are expensive to make because of the spaced perforations required in the ends of the cartons and suffer from severe mechanical weakness in the perforated end walls which results in breakage of the end walls from time to time.

The development of improved shirring machines of the type shown in the Korsgaard and Blizzard et al. patents made possible the shirring of greater lengths of casing than had been previously possible. The Blizzard et al. shirring machine produced a shirred casing having accordion pleats which were nested tightly in a concave manner with the result that the shirred and compressed casing could be held without external support. As the casing industry has tended to produce longer and longer shirred strands, e.g., today, strands up to 160 ft. are shirred, the problem of humidifying casing to the critical moisture content has become increasingly difficult. In longer strands of shirred casing, there is a considerable resistance to flow of moist air through the casing with the result that the ends of the casing tend to be more moist than the center of the casing.

In the copending application of Clarence M. Alsys, Serial No. 281,101, filed May 17, 1963, there is described a process and apparatus for simultaneous packaging and humidification of shirred sausage casings. In the Alsys invention, the shirred casing strands are packaged in a hermetically sealed container in contact with a moisture absorbent pulp or other moisture absorbent material containing a predetermined amount of moisture sufficient to humidify the casing to the desired level. This method of packaging and humidification, however, is subject to the disadvantage that the casing must be stored for many days at room temperature or a very slightly elevated temperature to allow the contents of the sealed carton to come to equilibrium with respect to the moisture present therein. It has also been found in more extensive tests that there is some tendency for the strands at the bottom of the carton to be more moist than those at the top of the carton due to migration of moisture by gravity. This invention is an improvement on the Alsys invention and is applicable to the uniform humidification of casings using other moisture applying steps.

Accordingly, it is one object of this invention to provide a new and improved method for humidifying or moistening shirred artificial sausage casings.

Another object of this invention is to provide a new and improved method of humidifying or of moistening shirred artificial sausage casings which permits the packaging of the casing in an unperforated carton.

Still another object of this invention is to provide an improved process for equilibration of the moisture in a partially-humidified, shirred, artificial sausage casing.

Still another object of this invention is to provide a new and improved method of accelerating the humidification of artificial sausage casings and equilibration of moisture content along the length of a strand of shirred casing.

A feature of this invention is the provision of a method of humidifying and/or moisture equilibrating shirred artificial sausage casings by packaging the shirred casing hermetically with sufficient moisture to supply a predetermined amount of moisture to the casing and subjecting the enclosed casing to high frequency electric heating.

Another feature of this invention is the provision of an improved method in which moisture is equilibrated along the length of shirred artificial sausage casing by enclosing the casing in a water proof covering and subjecting the same to high frequency electric heating.

Other objects and features of this invention will become apparent from time to time throughout the specification and claims as hereinafter related.

Figure 2:
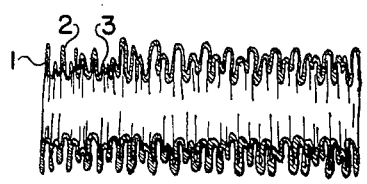
Figure 3:
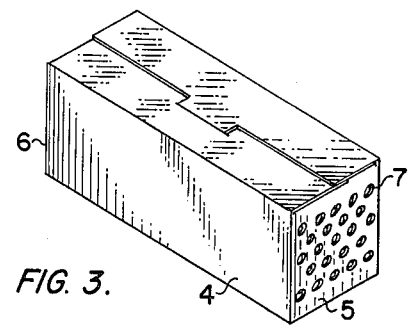
Figure 5:
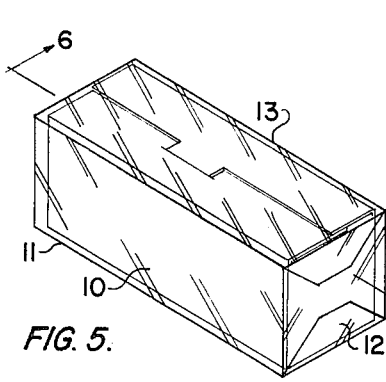
Figure 4:
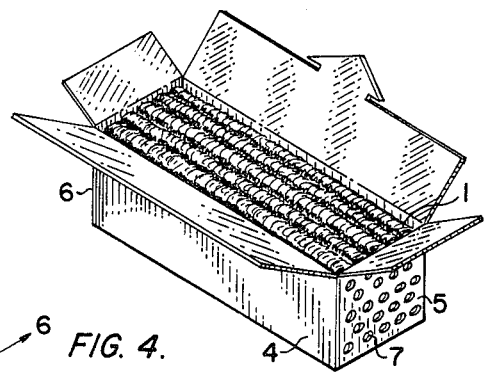
Figure 6:
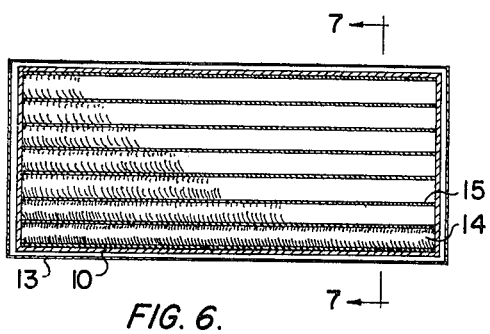
Figure 7:
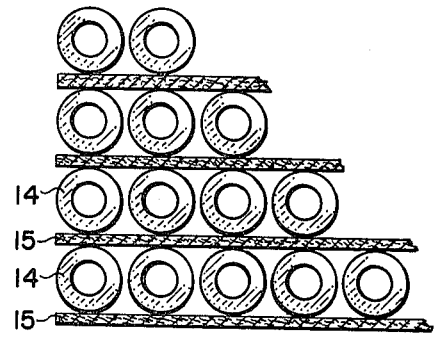
Figure 13:
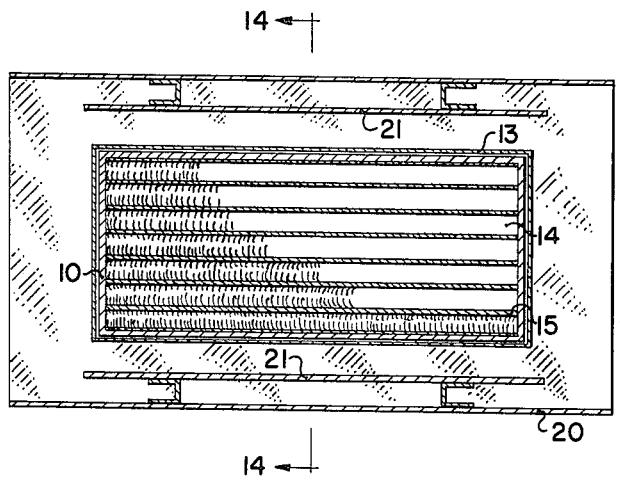
Figure 14:
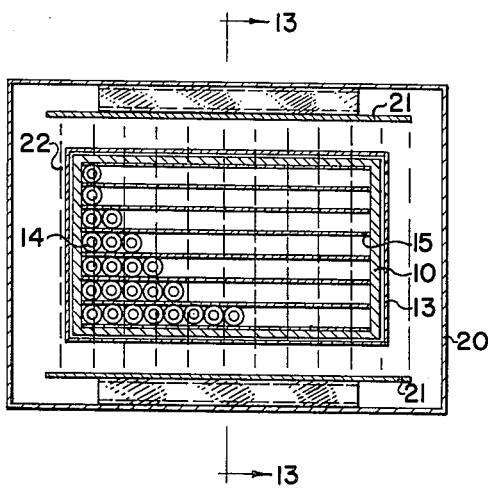

In the accompanying drawings, to be taken as part of this specification, there are clearly and fully illustrated several preferred embodiments of this invention, in which drawings, FIG. 1 is a view in elevation of the shirred strand of artificial sausage casing, FIG. 2 is a detail sectional view of the shirred casing taken on the line 2—2 of FIG. 1, FIG. 3 is an isometric view of a carton of the type shown in the prior art for packaging shirred casings, FIG. 4 is an isometric view of the prior art carton shown in FIG. 3 with the top opened and showing the shirred casings in place, FIG. 5 is an isometric view of a carton packaged for treatment in accordance with this invention, FIG. 6 is a sectional view taken longitudinally through the package shown in FIG. 5, FIG. 7 is a detail sectional view taken on the line 7—7 of FIG. 6 and showing the relationship of the shirred casings to the moisture absorbent material disposed throughout the package, FIG. 8 is a view similar to FIG. 6, of an alternate embodiment showing a different configuration for the moisture absorbent material within the package, FIG. 8a is a detail sectional view similar to FIG. 7 showing the relationship of the shirred casing strands and the absorbent material in FIG. 8, FIG. 9 is a sectional view similar to that shown in FIG. 8 showing still another embodiment of the moisture absorbent material within the package, FIG. 9a is a detail sectional view similar to FIG. 7 showing the relationship of the shirred casing strands and absorbent material in FIG. 9, FIG. 10 is a sectional view similar to FIG. 8 showing still another embodiment of the moisture absorbent material within the package, FIG. 10a is a detail sectional view similar to FIGS. 7 and 9a, showing the relationship of the shirred casing strands and moisture absorbent material in the embodiment shown in FIG. 10, FIG. 11 is a sectional view similar to FIG. 6, showing still another embodiment of the moisture absorbent material disposed throughout the package, FIG. 11a is a detail sectional view similar to FIG. 7, showing the relationship of the casing strands to the moisture absorbent material in the embodiment shown in FIG. 11, FIG. 12 is a sectional view similar to FIG. 6, showing yet another embodiment of the moisture absorbent material disposed throughout the package, FIG. 12a is a detail sectional view similar to FIG. 7, showing the realtionship of the casing strands to the moisture absorbent material in the embodiment shown in FIG. 12, FIG. 13 is a diagrammatic view showing a high frequency electrically heated oven containing a hermetically enclosed package as shown in FIG. 5, and FIG. 14 is a diagrammatic view taken on the line 14—14 of FIG. 13 and showing the relationship of the high frequency electric heating plates, tubes, or oscillators to the enclosed package.

In the copending patent application of Clarence M. Alsys, it is disclosed that shirred artificial sausage casings can be humidified to the critical predetermined moisture content required for satisfactory stuffing by packaging the shirred casing strands in contact with moisture absorbent material. A description of the Alsys method and package arrangement is essential to an understanding of at least certain features of the instant invention.

In the method described by Alsys, the shirred casing strands are preferably placed in contact with a moisture absorbent pulp containing a predetermined amount of moisture sufficient to humidify the casing to the desired level. The shirred strands of casing and moisture absorbent pulp, containing added water, are packaged within an imperforate carton, hermetically sealed, and stored for an extended period of time sufficient to allow the contents of the sealed carton to come to equilibrium with respect to the moisture present therein.

The hermetically sealed cartons are preferably stored at room temperature or higher, e.g., temperatures of 70 to 150° F. are satisfactory, for a period of time ranging from 7 to 28 days, sufficient to cause the contents of the carton to reach equilibrium. The humidification can not be carried out at higher temperatures due to the fact that synthetic cellulosic casings tend to shink or otherwise become distorted in the presence of excessive heat and moisture. The shirred casings placed within the carton are reported to pick up moisture uniformly from the absorbent material throughout the entire length of the shirred casings and with little variation in moisture between the major and minor pleats of the shirred strands or between the inter or outer portions of those strands. The casings humidified in this manner are reported to be equal to or superior to casings humidified using moist air and more uniform as to water content for longer length casings which are difficult to humidify by moist air circulation.

Referring to FIG. 1 of the drawings, there is shown a shirred strand 1 of an artificial sausage casing. In FIG. 2, the strand is shown in section in a manner which illustrates the major pleats 2 and minor pleats 3 of the shirred casing. In FIG. 2, the thickness of the casing is exaggerated somewhat in relation to the size of major pleats 2 and minor pleats 3. The artificial sausage casing whether of regenerated cellulose or other artificial casing materials, is preferably shirred using a machine of the type disclosed in the Korsgaard or Blizzard et al. U.S. Patents. In shirring artificial sausage casings, the casing is fed as flat stock from a reel onto the shirring machine and is shirred from lengths of the order of 40 to 160 feet down to shirred and compressed lengths of 8 to 27 inches.

In the past, it was necessary to humidify the shirred casing strands to a predetermined moisture content, e.g., 14 to 20% (preferably about 16 to 18%), by packaging a number of shirred strands in a carton and circulating moist air therethrough until the casings reached the desired moisture level. The several strands of casing were packed in layers in a carton 4 having end walls 5 and 6 with a plurality of perforations 7 therein. The carton 4 was provided with perforations 7 in opposite ends thereof so that moist air could be blown through the carton when packed with a number of strands of shirred casing. In FIG. 3, the carton is shown in a closed position while FIG. 4 shows the carton opened.

In the past, when shirred casings have been packaged and humidified in the above manner, there have been serious disadvantages arising both from the humidification process and from the structure of the packing carton. The cartons 4 have presented special problems in manufacture, due to perforations 7 in the end walls, and have been especially susceptible to damage due to the weakness of the end walls resulting from the perforations therein. Because the shirred strands of casing have been placed in the box or carton dry and substantially humidified, additional problems have arisen from the expansion of the shirred strands during humidification. In some cases, the strands expand to such a degree as to bulge out or even burst the end of the packing carton. In other cases, the strands have had the pleats interlock so that the expansion of one strand might have a tearing effect on an adjacent strand. A further objection to this packaging and humidification technique has been that the expansion of the shirred casings during humidification has resulted in the strands being tightly wedged in the packing carton with the result that it is difficult to remove the strands from the carton without damage.

In the Alsys invention, the shirred strands of artificial sausage casings are packed in a carton, preferably having imperforate walls, with the individual strands in contact with the moisture absorbent material disposed throughout the carton and containing sufficient moisture initially to transfer to the shirred strands of casing to humidify the casing to a predetermined moisture content during extended storage. In practice, the shirred strands of casings are placed in a carton 10 having imperforate sides and end walls 11 and 12 and enclosed in a moistureproof covering 13, e.g., a plastic film such as polyethylene, polyvinyl, Mylar, saran, etc. The closed carton containing the shirred casing strands and moisture absorbent material, enclosed in the moistureproof covering, is shown in FIG. 5 of the drawings.

In FIG. 6, there is shown a sectional view taken on the line 6—6 of FIG. 5. In FIG. 6, the carton 10 is shown enclosed in the waterproof covering or film 13. Shirred strands 14 of artificial sausage casings are shown disposed in layers within the carton 10 with dividers 15 of a moisture absorbent pulp therein. In FIG. 7, which is a detail sectional view taken on the line 7—7 of FIG. 6, the relationship of the shirred casing strands and moisture absorbent pulp dividers is shown in more detail.

In packaging and humidifying shirred strands of casing in the above manner, a sheet of moisture absorbent pulp, preferably of the texture of a blotter paper, is placed in the carton and a predetermined amount of water measured onto the pulp sheet. Several strands of shirred casing 14 are then placed in a layer on the moistened sheet of pulp and another sheet of pulp is placed on top of the layer. That sheet of pulp is in turn moistened by addition of a predetermined amount of water and another layer of shirred casing strands packed in place. The addition of alternate layers of shirred casing strands and sheets of moistened pulp is continued until the carton is filled. The carton is then closed and packed either alone or together with one or more additional cartons in a moistureproof covering, preferably a plastic film of any suitable material as described above.

In FIGS. 8 to 12 of the drawings, there are shown a number of modifications of this packaging arrangement which utilize different configurations of the moisture absorbent pulp layers which are used for transfer of moisture to the packaged shirred strands of casing.

In FIG. 8, a long continuous sheet of moisture absorbent pulp material is used for transfer of moisture to the strands of casing. In that packaging arrangement, the moisture absorbent pulp is disposed in a tortuous path back and forth through the carton with the shirred casing strands being placed in layers as in FIGS. 6 and 7. The moisture absorbent pulp sheet 15 is provided with a measured amount of water for each layer of shirred casing strands.

FIG. 9 shows an alternate packaging arrangement in which the sheets of moisture absorbent pulp are of a zigzag corrugated shape so that the shirred casing strands are contacted by the moistened pulp at additional points of contact to provide for better transfer of moisture. The relationship of the shirred casing strands to the corrugated moistened sheets of absorbent pulp is shown in more detail in FIG. 9a of the drawings.

FIG. 10 of the drawings shows still another modification in which the moisture absorbent pulp is formed in corrugations which have approximately the same radius of curvature as the shirred casings so that the casings are contacted with the moistened pulp over a greater surface. This relationship is shown in more detail in FIG. 10a of the drawings.

FIG. 11 shows still another packaging arrangement in which the moisture absorbent strips are placed in the carton in different planes to provide a division similar to that in an egg carton or a carton of the type used for packaging light bulbs or Christmas tree ornaments. This arrangement separates the shirred casing strands entirely from one another and provides additional points of contact with the moistened pulp to facilitate transfer of moisture to the casings. This arrangement is shown in more detail in FIG. 11a of the drawings.

FIG. 12 of the drawings shows still another arrangement of the moisture absorbent strips extending in different planes to separate the strands and provide a number of points of contact for transfer of moisture. This arrangement is seen in still more detail in FIG. 12a.

In the various packaging arrangements shown in FIGS. 5 to 12a of the drawings, the shirred casing strands are packaged in contact with the moisture absorbent pulp, or other moisture absorbent material, with a predetermined amount of moisture added to the pulp to transfer to the shirred casing a predetermined amount of moisture required to permit easy stuffing of the casings at a meat packing plant. The moisture is preferably metered onto the pulp during packaging of the cartons and the cartons are either singly or in groups enclosed in a moistureproof covering and stored at temperatures ranging from room temperature up to about 150° F. for periods of time ranging from 7 to 28 days.

The cartons are held at a predetermined temperature for a time sufficient to allow the contents to come to equilibrium. At equilibrium, the moisture absorbent pulp and the shirred casings have the predetermined amount of moisture, e.g., 14 to 20%, required for easy stuffing of the casings at a meat packing plant. The time and temperature required for the contents of the cartons to reach equilibrium are interdependent and inversely variable. Thus, at high temperatures, the casings will reach the desired moisture content in the shortest time, while at low temperatures, the time required is the greatest. In most cases, the cartons in which the shirred casings are stored are of a moistureproof cardboard, such as a wax coated cardboard, to avoid loss of moisture from the sheets of moisture absorbent material and the casings to the cardboard in the packing cartons.

In evaluating the above described packaging arrangement, a number of experiments were carried out in which different size and lengths of shirred regenerated cellulose casings were packaged and humidified to the predetermined critical moisture content required for satisfactory stuffing. The performance of these casings were compared with casings which had been humidified to substantially the same moisture content using the prior art technique of circulating moist air over the shirred casing strands contained in a perforated carton.

In evaluating this humidification and packaging technique, it was necessary to determine its effectiveness on hundreds of strands of sausage casing to determine whether or not it would be satisfactory for commercial use. It is, therefore, impractical to set forth either by specific example or in a tabulated form the results obtained on the application of this humidification and packaging technique to any statistically significant number of shirred casing strands. The following examples are, therefore, illustrative of the results obtained with a large number of shirred sausage casings:

*Example 1*

A number of regenerated cellulose casings of the type used for production of frankfurters were shirred, humidified, and packaged in accordance with this invention. The casings had a diameter of 22.50 mm., a thickness of 0.9 to 1.1 mils, and were 55 ft. in length (shirred length 9 in.). These casings had an initial moisture content of 8 to 10%, which is the moisture level required for satisfactory shirring.

The casings were packaged in an imperforate cardboard carton measuring 10½ in. x 8 ¾ in. x 4⅜ in. The humidification of the shirred casing strands was effected using sheets of a heavy blotter paper and measuring 8½ in. x 10 in. (dry weight 44.6 g.). One of the sheets of absorbent pulp was placed in the bottom of the cardboard carton, and 53.5 g. water was added uniformly to the sheet. Ten strands of shirred cellulose casing were laid upon the moistened pulp and a sheet of pulp of the same size placed on top of the layer of shirred casing strands and the same amount of water added to the pulp. This procedure was repeated until the carton was full and a top layer of pulp added and moistened. The carton, when full, contained five layers of shirred casing strands (ten strands to the layer) and six sheets of moistened pulp.

The carton was then closed and sealed in a moistureproof covering of polyethylene film. The carton was stored for 21 days at 70° F. to allow the moisture to reach equilibrium. The shirred casing strands which were packaged in this container had a moisture content of 10 to 18% which varied less than 1% between the major and minor pleats of the shirred strand and was substantially invariable along the length of the shirred strand.

These shirred casings were stuffed at a meat packing house using a commercial sausage stuffer which filled the casings from shirred length to the fully extended 55 ft. length in 4 to 5 sec. Under these stuffing conditions, the breakage of the casings was about 3%. This breakage is equal to or lower than breakage of casings of the same size, and shirred conditions which have been humidified to the same moisture content using the most air humidification of the prior art.

*Example 2*

Another series of experiments were carried out in which frankfurter casings 21.50 mm. diameter, 0.9 to 1.1 mils thickness, and 84 ft. length (15 in. shirred length) were humidified and packaged in accordance with this invention. The shirred casings were packaged in a carton measuring 16 in. x 8¾ in. x 4⅜ in. The carton was of a waxed cardboard so that there would be no moisture lost from the casing to the carton.

The shirred casings were packaged in the carton in five layers of ten strands with six sheets of moistened absorbent pulp as described in the previous example, separating and contacting the strands of casing for transfer of moisture thereto. The sheets of pulp were 8⅞ in. x 15⅞ in. x 0.035 in. (68 g. dry wt.). Each of the sheets of absorbent pulp was moistened with 78 g. water. The filled carton was closed and packaged in a moistureproof covering of polyethylene film and stored at 75° F. for 14 days. The casings which were treated in this manner had a uniform moisture content of 16% with substantially no variation between the major and minor pleats of the shirred strands or linearly thereof.

In a test at a commercial meat packing house using a sausage stuffer having a stuffing speed of 8.1 ft./sec., 200 strands of casing were stuffed with no breakage. At the same time, 200 strands of casing were stuffed which had been humidified to 16% moisture content using the prior art moist air humidification technique. Under these stuffing conditions, one of the strands was broken which had been treated in accordance with the prior art humidification technique.

Experiments have been carried out in which several thousand strands of shirred cellulosic casings have been packaged and humidified as described above. In these many experiments, casings were packaged and humidified which varied considerably in size and length and in the conditions of humidification. In each case, the shirred casings were packaged in contact with sheets of absorbent pulp having sufficient moisture added to produce a 15 to 20% (preferably 16 to 18%) moisture content in the casing after storage for a sufficient time to allow the moisture to reach equilibrium. The casings were packaged and stored in this manner for periods of time ranging from 7 to 28 days and temperature ranging from 70° F. to 100° F. (temperatures up to about 150° F. can be used if desired). As a result of these experiments, it was found that the rate of moisture transfer to the shirred casing strands is a function of time and temperature. At higher temperatures, the shirred casings will reach the critical predetermined moisture content required for stuffing in 7 days. At room temperature, the casings must be stored for 14 to 28 days for the moisture to reach equilibrium. The casings which have been packaged and humidified in these experimental runs have been tested for moisture distribution and have been stuffed at commercial packing houses to determine whether the casings humidified in this manner are commercially useable. In every case, a comparison was made between casings which were humidified using the procedure of this invention and casings which were humidified following prior art humidification processes.

One of the principal advantages which has resulted from this packaging arrangement is a more uniform humidification of shirred casings along their entire length and along the major and minor pleat structure. Casings which have been humidified to a moisture content of 17 to 18% using the prior air humidification technique often vary as much as 3 to 5% in moisture content between the major and minor pleats and vary considerably in moisture content along the length of the shirred casing strand. For example, a 160 ft. shirred casing (29 in. shirred length) was humidified to an average moisture content of 18% using the prior art moist air humidification technique. The moisture content of the casing was found to vary from 20 to 21% at the extreme ends to 12% at the center of the strand. The moisture will distribute evenly within the casing strand upon extended storage, but substantial differences in moisture content between the ends and middle of the strand have been found after storage periods of 60 to 90 days. A 160 ft. shirred strand (29 in. shirred length) was humidified to a 17 to 18% moisture content using the procedure of this invention, and the moisture content was found to vary less than 1% along the length of the casing and between the major or minor pleats or the outside or inside of the shirred strand.

From the above description of the Alsys packaging and humidification process and apparatus, it is seen that it is possible to humidify shirred artificial sausage casings without circulating moist air thereover. The Alsys process and apparatus, however, is subject to the disadvantage of requiring a very extended period of storage which necessitates the maintenance of excessive inventories of sausage casings. It is also subject to the disadvantage that there is some gravity effect in the process which tends to humidify the lower casings in a carton to a greater extent than the top casings. The present invention constitutes an improvement on the Alsys process and is also applicable to the humidification and equilibration of moisture in shirred casings which have been humidified by other processes.

This invention is based upon the discovery that shirred artificial sausage casings can be humidified to a predetermined moisture content and can be moisture equilibrated by packaging the casings in a moisture-proof covering together with sufficient moisture to provide the predetermined desired moisture content in the casing. The packaged casings are then subjected to high frequency electric heating at a sufficient frequency and power input and for a time sufficient to initiate and/or effect a substantial equilibration of the moisture within the enclosure. It has been found that if the casings are subjected to high frequency electric heating for a relatively short time, e.g., 0.1 to 5 minutes, at a frequency in excess of 1 megacycle, (ranging up to several thousand megacycles in a microwave heater) the casings quickly attain a moisture content of approximately 60 to 90% of the desired moisture content for fully humidified casing. However, after standing at room temperature for a period of several hours, e.g., 6 to 24 hours, the moisture content of the casing is found to be completely equilibrated to the desired moisture level.

In this process the high frequency electric heating includes both dielectric and microwave heating. Both types of heating work on a dielectric principle but dielectric heating utilizes a pair of high frequency capacitive plates while microwave heating uses a high frequency tube, e.g., a magnetron. The frequencies which can be used for high frequency electric heating cover the range from one megacycle to several thousand megacycles. The Federal Communications Commission (United States) has limited high frequency heating bands to those having mid-frequencies at about 14; 27; 41; 915; 2450; 5850; 18000; and 22000 megacycles.

Both dielectric heating and microwave heating can be used in this process. Heating is a function of the strength of the RF power density and of time. The depth of heating is a function of frequency. Frequencies in the region up to 900 mc. penetrate deeply whereas higher frequencies product heating at or near the surface. When either type of high frequency electric heating is used to equilibrate shirred casing the treatment is given for a time sufficient to produce a moderate increase in vapor pressure within the enclosed package. The package is then allowed to stand at ambient temperature for several hours to complete the equilibration.

In FIGS. 13 and 14 of the drawings, this process is illustrated diagrammatically. A carton 10, as shown in FIG. 5 is packed with strands of shirred sausage casings and alternate layers of moisture absorbent sheets which have been moistened to a predetermined extent as described above. The carton 10 is closed and hermetically sealed in a moisture proof covering 13, either alone or with additional cartons. The moistureproof covering 13 is preferably in a suitable waterproof or moistureproof plastic film as described above. The hermetically sealed carton is then placed in a high frequency oven 20 having dielectric heating plates 21 which are connected to a suitable high frequency power source (not shown). Alternatively, a high frequency tube, such as a magnetron, can be used. In FIG. 14, there is shown a section through the high frequency electrically heated oven with the enclosed carton in place. The positioning of the individual shirred casing strands 14 and layers of moisture absorbent pulp 15 are illustrated. The high frequency electrical field produced in the heater is illustrated diagrammatically by dotted lines 22 which represent the electrical lines of force of the field. The exact proportioning of the heating plate 21 and the power and frequency input requirements of the heater are selected according to known engineering principles.

Dielectric heating utilizes the flow of radio frequency currents (e.g., frequencies in excess of about 1 megacycle) through the material which is to be heated. The material being heated functions as a dielectric medium in a capacitor which is formed by the electrodes of the heater. The power required for a given temperature rise of the material or a component of the material (e.g., the water to be equilibrated) can be determined from its mass, its specific heat, and the temperature difference. The power required is calculated in accordance with the power dissipated in the material to be heated in accordance with the formula:

$$P = 1.41 f E_w^2 \epsilon' \delta \frac{A}{d} \times 10^{-12} (\text{watts})$$

where $f$ = frequency (cycles per second)
$A$ = electrode area (sq. in.)
$\epsilon'$ = dielectric constant of material being heated
$E_w$ = R.M.S. voltage across material
$d$ = material thickness
$\delta$ = loss factor For a given power requirement, the required work voltage can be determined from the above equation. The peak value, or 1.41 $E_w$, must be less than dielectric strength of the material being heated, preferably with a suitable safety factor. In any given system, the frequency used in the dielectric heater is selected to insure that this condition is met.

The electrode voltage must appear across an equivalent circuit consisting of a capacitance of $$C = 0.224 \epsilon' \frac{A}{d} (\mu\mu f.)$$

in parallel with a resistance of $$R_s = \frac{1d}{2\pi f C \delta} (\text{ohms})$$

At frequencies above 200 mc. (and up to 25,000 mc. or higher) dielectric-type high frequency electric heating is more commonly referred to as microwave heating. The high frequency electric field is generated by a tube such as a magnetron. Precise power requirements, tube sizes, etc. can be calculated according to known engineering principles.

While FIGS. 13 and 14 show the application of dielectric or microwave heating to casings having moistened pulp dividers of the type shown in FIGS. 6 and 7, it should be understood that the process is applicable to any of the packaging arrangements shown in FIGS. 5 to 12a. Furthermore, the process is applicable to the humidification and equilibration of moisture within the hermetically sealed package in which the moisture is present in any suitable form. The moisture may be added to pulp dividers as shown or may be present as excess moisture in part of the shirred casing strands or as moisture in the walls of the paper carton or in any other suitable form.

The following examples illustrate the application of the principles of this invention.

*Example 3*

A number of regenerated cellulose casings of the type used for the production of frankfurters was shirred, humidified, and packaged in accordance with this invention. The casings had a diameter of 19.5 mm. and were 80 ft. in length (shirred length 13 in.). These casings had an initial moisture content of 8 to 10% which is the moisture level required for satisfactory shirring.

The casings were packed in an imperforate carton using divider sheets of absorbent pulp having the consistency of heavy blotter paper. Sufficient water was added uniformly to each sheet of absorbent pulp to provide a total moisture content of about 18% based on the total weight of pulp and shirred strands of casing. Ten strands of shirred cellulose casing were laid upon the moistened pulp sheet and a sheet of pulp the same size placed on top of the layer of shirred casing strands and the same amount of water added to the pulp. This procedure was repeated until the carton was full and a top layer of pulp added and moistened. The carton, when full contained five layers of shirred casing strands (ten strands to the layer) and six sheets of moistened pulp.

The carton was then closed and sealed in a moisture-proof covering of polyethylene film. The carton was placed in a Raytheon Mark IV B microwave heating oven operated at a frequency of 240 megacycles and 0.8 kw. for a period of 2 minutes. The enclosed carton was then stored at room temperature for a period of 24 hours. Individual strands of shirred casing were removed from the sealed carton immediately after dielectric heating and at periods of 2½ hours, 9½ hours, and 24 hours, respectively, after removal from the dielectric heater.

These strands were analyzed for moisture content by the Karl Fischer technique to determine the percent moisture at various positions in the strand. After 2½ hours' storage, the shirred strands averaged 12.38% moisture in the inside folds and 15.33% moisture in the outside folds. After 9½ hours' storage, the inside folds averaged 16.49% moisture in the outside folds 17.69% moisture. After 24 hours' storage, the inside folds averaged 18.47% moisture and the outside folds 18.78% moisture.

These shirred casings were stuffed using a synthetic meat emulsion having the same consistency as meat emulsions used in meat packing houses for the preparation of commercial sausages. The stuffing filled the casings from shirred length to fully extended 80 ft. length in 7 to 8 seconds. Fifty of the strands were stuffed with no breakage. This breakage is lower than that encountered for casings of the same size and shirred condition which have been humidified to the same moisture content using the moist air humidification of the prior art or other moistening techniques.

Example 4

Several cartons of shirred regenerated cellulose casings of the type described in Example 3 were packaged as described in that example and subjected to dielectric heating for periods of 0.1 to 5 minutes at a frequency of about 27 megacycles and 7 kw. power input.

The samples which were dielectrically heated for periods of about 3 to 5 minutes developed an excessive water vapor pressure and it was decided to heat the casing for shorter periods of time. In the several tests that were carried out in which casings were dielectrically heated in hermetically sealed containers along with moistened absorbent pulp sheets, it was found that the casings acquired a higher initial moisture content when heated for longer periods of time at lower power input. However, it was found that casings which were heated for 2 minutes would equilibrate to the desired moisture level, e.g., 17–18%, after a period of about 9 to 24 hours. In each case, the casings which were moisture equilibrated in this manner were found to have a very uniform moisture content, less than 1% variation from end to end and between the outer and inner portions of the folds in the shirred casing strands. When these humidified shirred casings were stuffed at a meat packing house using a commercial sausage stuffer, the breakage was equal to or lower than the breakage of casings of the same size and shirred condition which had been humidified to the same moisture content using prior art techniques.

Example 5

Several strands of shirred regenerated cellulose casings were wrapped in plastic film together with a moistened sheet of absorbent pulp. Casings were then subjected to dielectric heating at about 27 megacycles and 7 kw. power input for a period of 0.5–1.0 minute. After 24 hours' storage at room temperature, the casings were found to have equilibrated to a substantially constant moisture content of 17–18% with little variation between inside and outside folds or linearly along a shirred strand.

Example 6

Several additional cartons of regenerated cellulose casings were processed as described in Examples 4 and 5 above. The strands of shirred casing were placed in the cartons with 6 wetted pulp sheets per carton and the cartons closed and wrapped in polyethylene film. The cartons were heated for 0.5–1.0 minute in a dielectric heater at a frequency of about 27 megacycles and power input of 7 kilowatts. Experiments were carried out in which the cartons were placed with the moistened pulp dividers parallel to the electrical field in the dielectric heater and with the pulp dividers intersecting the electrical field. The test results indicate an advantage to placing the cartons with the moistened pulp sheets intersecting the dielectric field. In fact, if the field is parallel to the dividers the process is workable but quite inefficient.

It was found that the above exposure to dielectric heating caused an increase in temperature within the carton to a maximum of about 85 to 97° C. The cartons were then stored for several hours at room temperature. It was found that the shirred casings had an uniform moisture content of about 17–18% after 24 hours storage. There was substantially no shrinkage of the casing, which is encountered when shirred casings are subjected to moist air at temperatures of 85–97° C. The casings were uniform in moisture content from end to end and on the inside and outside folds.

Stuffing tests which were run on these cases showed breakage of 1% or less, which is equal to or superior to casings humidified by prior art techniques.

Example 7

Fibrous casing, which is used for packaging large sausages, is difficult to humidify by prior art techniques. Fibrous casing is prepared by forming a high-wet-strength hemp paper into a continuous elongated tube, and impregnating the paper with viscose, and regenerating it to form a paper reinforced casing. In many cases, fibrous casing is sold as reel stock in a flat condition. Recently, however, there has been an increasing demand for shirred fibrous casing for continuous production of large diameter sausages.

Ten strands of shirred fibrous casing having a dry flat width of 4⅝ in. and an unshirred length of 30 ft. are placed in a carton in two layers of five strands each. A layer of moistened absorbent pulp is placed at the top and bottom of the carton and between the layers of shirred fibrous strands. Sufficient moisture is added to the pulp to provide a moisture content of about 20% in the shirred casing after equilibration. The carton is then wrapped in polyethylene film and subjected to dielectric heating at 27 megacycles and 7 kilowatt input for a period of 1–2 minutes. After storage for 24 hours, the casings are found to have a uniform moisture content of 19.5–20.5%, with less than 1% variation from end to end or between the inside and outside folds of the shirred strands.

Example 8

Several strands of 160 ft. shirred casing (29 in. shirred length) were humidified to an average moisture content of 18% using the prior art moist air humidification technique. The moisture content of the casings was found to vary from 20 to 21% at the extreme end to 12% at the center of the strand. The moisture will distribute evenly within the casing strand upon extended storage, but several percent difference in moisture content between the ends and middle of the strand have been found after storage periods as long as 60 to 90 days.

When the 160 ft. strands described above are enclosed in a carton and hermetically sealed by covering with a plastic film and dielectrically heated, a substantial equilibration of the moisture content takes place. The strands hermetically packaged, as described above, are subjected to dielectric heating at a frequency of about 27 megacycles for a period of 0.5–1.0 minute and then allowed to stand at room temperature for 24 hours. At the end of this time, the moisture has completely equilibrated within the casing so that there is less than one percent variation in moisture content between the ends and the center of the strand. Also, there is substantially no variation between the outer and inner folds of the shirred strand. When these casings are stuffed, the amount of breakage is equal to or less than that which occurs with casings humidified by prior art humidification techniques.

A large number of tests were made to determine the longitudinal transverse tensile strength of casings humidified by this process. While the tests are not conclusive, there is some considerable evidence that casings humidified in accordance with this invention are slightly stronger and have slightly lower elongations at break than casings humidified by the prior art moist air humidification technique. For example, a series of tests were carried out on the casings humidified as described in Examples 5 and 6. These samples were compared with controls which had been made by essentially the same process but humidified by the prior art moist air humidification technique to the same moisture content. The control averaged 4190 p.s.i. and 97% elongation at break in the longitudinal direction and 4122 p.s.i. and 203% elongation at break in the transverse direction. The casings which were humidified as described in Examples 5 and 6 had tensile strengths ranging from 4950 p.s.i. to 5880 p.s.i. and 83 to 92% elongation in break, in the longitudinal direction. The same casings had tensile strengths ranging from 4780 p.s.i. to 5240 p.s.i. and elongations at break ranging from 148 to 160%, in the transverse direction. While the tests were not comprehensive enough to eliminate all possible errors due to process variables, there is some strong indication that the tensile strengths and elongations both in the longitudinal and transverse directions are substantially improved by humidification in accordance with this invention.

While this invention is particularly applicable to the packaging and humidifying of sausage casings of cellulose of the type used for preparation of frankfurters, the process is obviously applicable to the packaging and humidification of a wide range of casings. The process is primarily useful for thin-walled regenerated cellulose casings but can be used for sausage casings of the thicker wall construction (known in the trade as miscellaneous casings) and may be used for humidification of fibrous casings or casings of a non-cellulosic type, e.g., alginate, amylose, casein, collagen, etc. As described above, the process is applicable to the humidification and equilibration of moisture content within shirred artificial casings by dielectric or microwave heating in association with sufficient water to provide the predetermined desired moisture content in the shirred casings. The water may be present in the casing itself or in the carton in which the casing is packed, in moisture-absorbent dividers, in sponges or other moisture-absorbent or moisture-occluding materials having a form such that the application of high frequency electric heating is operable to vaporize (i.e., to increase the vapor pressure substantially) at least part of the water and to equilibrate the moisture content within the casings. While the casings can be completely equilibrated by longer exposure to dielectric or microwave heating at low power input (e.g., up to 30 min. or more), it is preferable to heat the casings and moisture for relative short times, e.g., 0.1 to 5 minutes, at frequencies in excess of 1 megacycle, to initiate the equilibration, and then store the casing at ambient temperature for several hours to allow the equilibration to be completed.

While the invention has been described with special emphasis upon certain preferred embodiments and certain preferred processing conditions, it will be obvious that variations in package configuration and process conditions can be made without departing from the inventive concept. Thus, the power input and frequency of the high frequency electric heater can be varied considerably in accordance with the moisture load and condition of the moisture (i.e., whether present as free or bound water). It will also be obvious that this method can be used both for full and complete humidification of shirred casings and equilibration of moisture within shirred casing strands or any combination of humidification and moisture equilibration. The humidification and equilibration may be complete as the result of the high frequency electric heating but is preferably initiated by the high frequency electric heating and completed after a short period of storage at ambient temperatures. It will, therefore, be obvious to any person skilled in the art that, within the scope of the appended claims, this invention can be practiced otherwise than as specifically described herein.

What is claimed is:

1. A method of humidifying shirred artificial sausage casings to a predetermined higher moisture content which comprises
   packing said casings at a predetermined lower moisture content in a water proof covering together with moisture absorbent material containing sufficient moisture to supply the predetermined higher moisture content,
   and subjecting the enclosed casings to high frequency electric heating at a frequency in excess of 1 megacycle for a time, in the range from about 0.1–5.0 min., sufficient to initiate a substantial equilibration of the moisture.

2. A method in accordance with claim 1 in which the enclosed casings are stored for a period of several hours at ambient temperatures following said high frequency electric heating to complete the moisture equilibration.

3. A method in accordance with claim 1 in which the casings are contacted with moisture before packaging and the high frequency electric heating is operable to effect equilibration of moisture between moist and dry portions of the casings.

4. A method in accordance with claim 1 in which the casings are of regenerated cellulose and said predetermined higher moisture content is about 14–20%.

5. A method in accordance with claim 1 in which the casings are fibrous cellulosic casings.

6. A method in accordance with claim 1 in which said casings are packaged in layers in a closed carton in contact with a moisture absorbent material and a predetermined amount of water is added to the moisture absorbent material sufficient to humidify said casings to said predetermined higher moisture content when subjected to said high frequency electric heating.

7. A method in accordance with claim 6 in which the casings are stacked within said carton in layers and said absorbent material comprises sheets of moisture absorbent pulp positioned between said layers.

8. A method in accordance with claim 7 in which said sheets of pulp are paper of the texture and consistency of blotter paper.

References Cited by the Examiner

UNITED STATES PATENTS

| | | | |
|---|---|---|---|
| 2,336,291 | 12/1943 | Phillips | 99—193 |
| 2,470,465 | 5/1949 | Broeren et al. | 99—192 |
| 2,627,466 | 2/1953 | Lewis | 99—176 X |
| 2,704,259 | 3/1955 | Lamb | 99—176 |
| 2,999,757 | 9/1961 | Shiner et al. | 99—176 |
| 3,135,613 | 6/1964 | Underwood | 99—176 |
| 3,148,992 | 9/1964 | Hewitt | 99—176 |

FOREIGN PATENTS 493,644    6/1953    Canada.

A. LOUIS MONACELL, *Primary Examiner.*

HYMAN LORD, *Examiner.*